Sept. 14, 1926.  1,599,594
G. F. SOCKMAN
TIN PACK HEATING FURNACE
Filed Jan. 5, 1926  3 Sheets-Sheet 1

INVENTOR
George F. Sockman.
BY
Albert E Dietrich
ATTORNEY

Sept. 14, 1926.
G. F. SOCKMAN
TIN PACK HEATING FURNACE
Filed Jan. 5, 1926
1,599,594
3 Sheets-Sheet 2
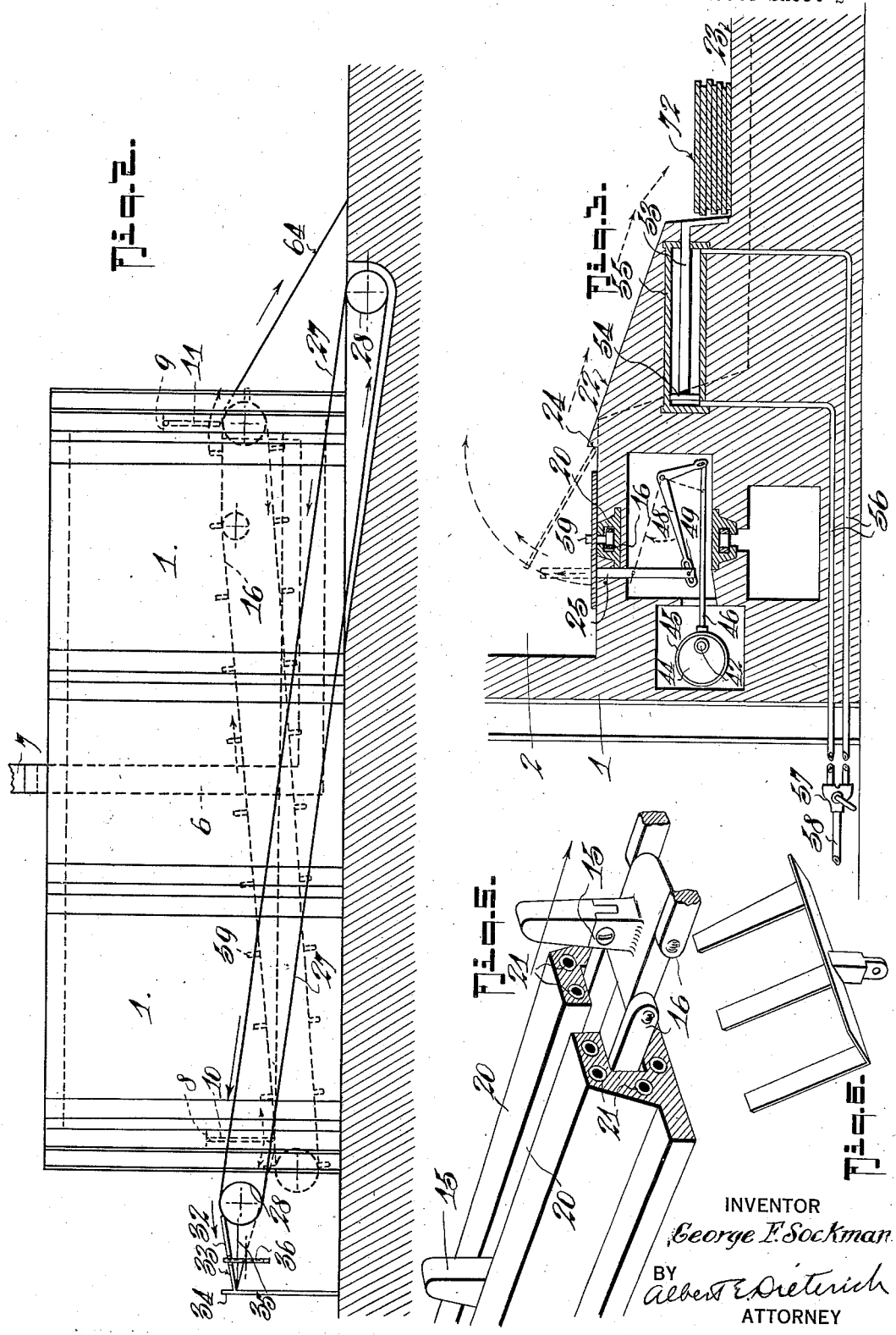
INVENTOR
George F. Sockman
BY
Albert E. Dietrich
ATTORNEY

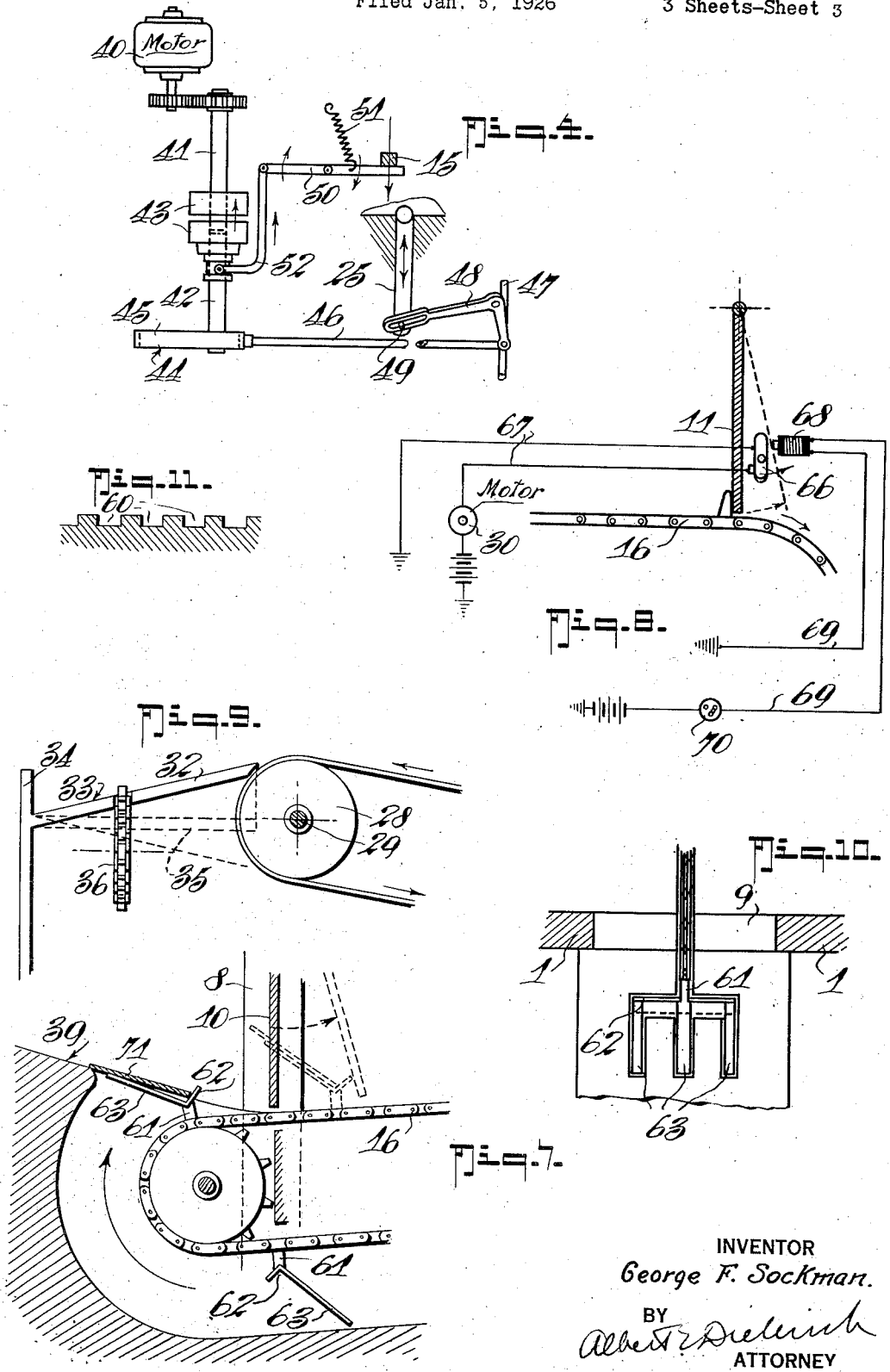

Patented Sept. 14, 1926.

1,599,594

UNITED STATES PATENT OFFICE.

GEORGE F. SOCKMAN, OF BALTIMORE, MARYLAND.

TIN-PACK-HEATING FURNACE.

Application filed January 5, 1926. Serial No. 79,500.

The invention generally has for its object to provide a tin pack heating furnace wherein is provided means for conveniently and efficiently handling and conveying the packs into and through the heating chamber in a manner insuring proper thorough heating thereof preparatory to final rolling.

In its more detailed nature the invention seeks to provide an improved heating furnace structure and conveyors for receiving the tin, black plate, or sheet iron packs as they leave the doubler and conveying them through the furnace, automatic handling devices being provided for so handling the packs as to assure proper thorough heating of the same as they pass through the furnace.

With the above and other objects in view that will hereinafter appear, the invention still further resides in the novel details of construction, combination and arrangement of parts, all of which will be first fully described, then be particularly pointed out in the appended claims, reference being had to the accompanying drawings, in which:—

Figure 2 is a somewhat diagrammatic side elevation illustrating the invention.

Figure 3 is an enlarged cross section taken on the line 3—3 on Figure 1.

Figure 4 is a diagrammatic plan view illustrating means for flipping the packs.

Figure 5 is a detail perspective view of a portion of the main conveyor chain with a push type of lug projected therefrom.

Figure 6 is a detail perspective view of one of the carrier types of lugs which may be connected to project from the chain.

Figure 7 is a detail cross section taken on the line 7—7 on Figure 1.

Figure 8 is a diagrammatic cross section illustrating a means for automatically cutting off the motive power to the conveyors and for resetting the same.

Figure 9 is a detail cross section of the cross conveyor table at the point of delivery of the endless apron conveyor.

Figure 10 is a diagrammatic plan of the delivery incline adjacent the offtake passage.

Figure 11 is a detail cross section of the inclined trackway showing the surface thereof corrugated.

Figure 1:
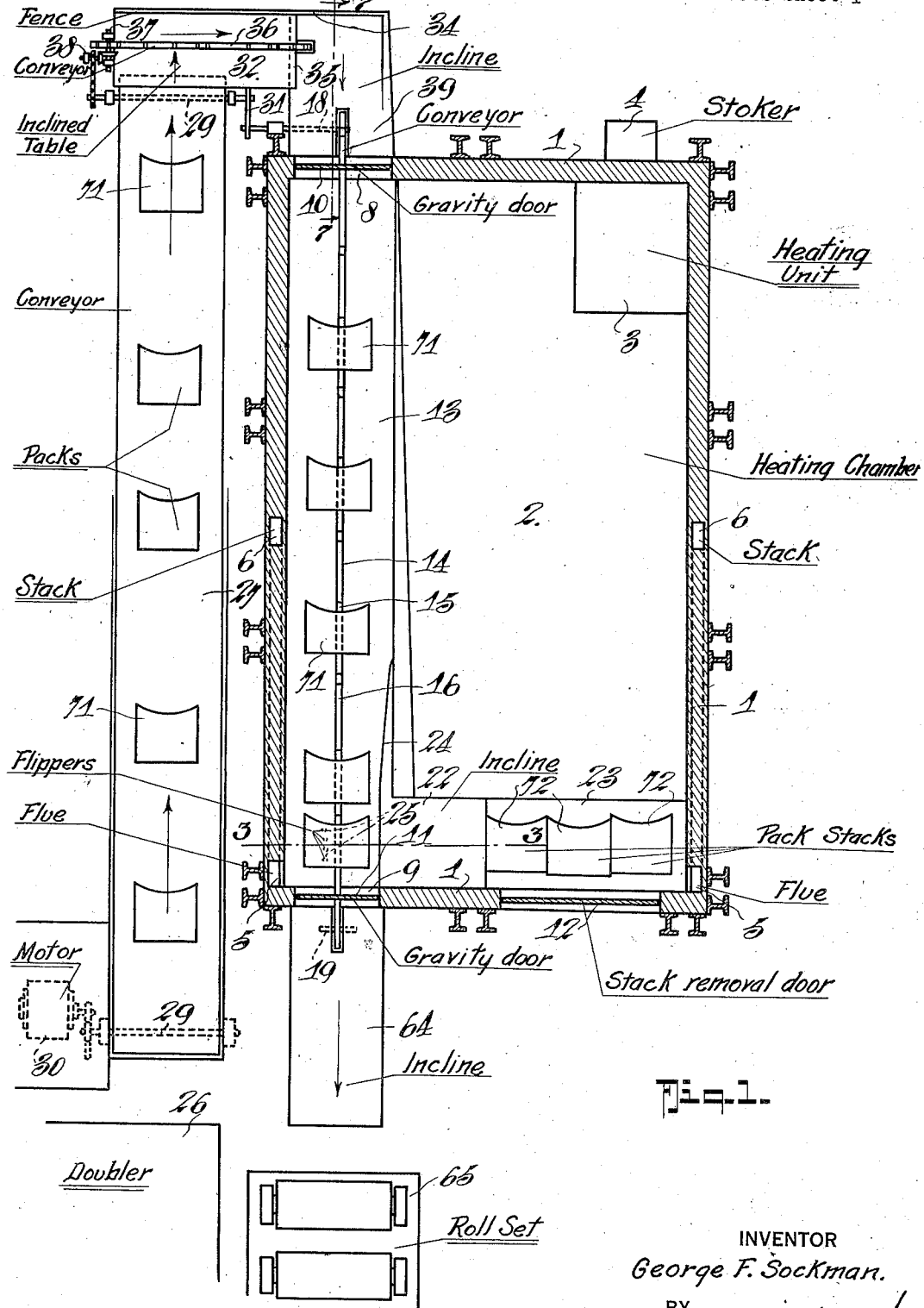
Figure 1 is a somewhat diagrammatic plan view illustrating the invention.

In the drawings, in which like numerals of reference indicate like parts in all of the figures, 1 indicates the walls of a heating furnace which may be constructed in the usual manner of fire-brick, steel beam supported and said walls enclose a heating chamber 2 which is to be kept heated to the desired temperature by any approved heating unit 3. When a heating unit adapted for using coal as the heating agent is employed any approved type of automatic stoker 4 may be employed in connection therewith. The furnace is provided with two or more downwardly directed flues 5 at the end thereof remote from the heating unit and the said flues communicate with takeoff stacks 6 which pass upwardly through the side walls of the furnace near the center and may communicate with each other above the furnace to empty into a common takeoff stack indicated at 7. The flues and stacks may be provided with suitable dampers for controlling the same in the usual manner, the dampers not being shown as any approved type may be employed and their use is well understood.

At one side of one end of the furnace is provided an intake passage 8 and at the like side of the opposite end of the furnace a similar offtake passage 9 is provided, the said passages being equipped with gravity hanging doors 10—11, respectively. The doors 10—11 are of the pivoted pendently hanging type which will freely swing on their pivot to permit passage of devices thereunder and return by gravity to their vertical hanging position. The end wall of the furnace which is equipped with the passage 9 is also provided with a stack removal door 12, through which access may be conveniently had to the interior of the heating chamber.

As is common in heating furnaces the floor of the furnace is elevated a distance above the floor of the work-room and the floor of my heating chamber is provided at one side with an inclined trackway 13 extending on an upward incline from the intake passage 8 to the offtake passage 9 and the said trackway is provided with a longitudinally centrally disposed grooveway 14 through which project the conveyor lugs 15 which are secured to certain links of the endless conveyor chain 16 which travels over end sprockets 17 mounted on shafts 18 and 19 and in metal guideways 20 embedded in the fire-brick of which the trackway 13 and the base of the furnace are constructed. As the guideways 20 and chain 16 are subjected to great heat in passing through the heating chamber it may be desirable to provide the said guideways with cooling pipes 21 through which water may be circulated to prevent burning out of the said guideways.

At its remote end the inclined trackway 13 merges with a lateral incline 22 which delivers onto a receiving platform 23 convenient to the entrance door 12 and of suitable proportions for receiving several stacks of plate packs. It will be observed that the inclined trackway 13 starts at the intake door 8 at the level of the heating chamber floor and inclines upwardly to a considerable elevation above that floor, thus providing for the lateral incline 22 and making it possible for that incline to be so constructed as to efficiently deliver onto the receiving platform 23 which is approximately on the heating chamber floor level. The lateral incline 22 is continued slightly above its juncture with the trackway 13 to provide an abutment ledge 24, and just to the left of the grooveway 14 and in alignment with the lateral incline 22, the trackway 13 is equipped with a plurality of flipper plungers 25 which are vertically movable in guideways formed in the said trackway, the purposes of both of which will be described later.

In Figure 1 of the drawings in which I have diagrammatically illustrated the layout of my improved furnace and attendant devices I have generally indicated, as to position, a doubler, by the numeral 26. Preferably, one side of my furnace is provided with an endless apron conveyor 27 having its receiving end positioned conveniently adjacent the doubler and being adapted to operate on an incline to receive the packs of tin plate, black plate or sheet iron and convey them in the manner indicated in Figures 1 and 2 of the drawing to an elevation above that of the heating chamber floor and slightly beyond the farthest end of the furnace. The conveyor 27 takes over suitable end pulleys 28 mounted on shafts 29, one of which may be driven by the motor 30 in the manner indicated by Figure 1. Also, one of the conveyor shafts 29 may be connected by power transmission agencies 31, with one shaft of the endless conveyor chain 16 for the purpose of imparting movement to that conveyor chain.

The elevated extremity of the apron conveyor 27 delivers onto a short cross table 32, the receiving end of which is inclined downwardly backwardly, as at 33, so that the packs delivered thereonto will slide rearwardly into engagement with the stop or abutment fence 34. As the table 32 extends over toward the furnace it flattens out to a horizontal plane, as at 35, to provide a discharge end. The table is provided with a longitudinal grooveway in which operates the upper flight of an endless conveyor chain 36 certain links of which are provided with upstanding pusher lugs and the said chain passes over sprockets on shafts 37, one of which is driven by the power transmitting devices 38 from the upper endless apron conveyor shaft 29. The table 32 discharges onto a downwardly inclined slideway 39 which delivers into the intake passage 8, the endless conveyor chain 16 working through a recess in the lower end of the incline so that its lugs will engage the tin packs which gravitate to the bottom of the incline and carry the same through the gravity door 10 and along the trackway 13.

The operation of the device as thus far described is as follows:

The plate sheets are doubled upon themselves on the doubler in the manner well understood to those skilled in the art and the packs thus formed are deposited on the conveniently positioned receiving end of the endless conveyor apron 27 to be carried upwardly to the rear delivery end of the said apron and there deposited upon the cross table 32. As each pack is deposited upon the table 32 it will gravitate rearwardly into engagement with the fence 34 and will be engaged by one of the upstanding lugs on the conveyor chain 36 which will convey it across the table in the direction indicated by the arrow and deposit the same onto the incline 39 down which the same will gravitate into position for being picked up by one of the upstanding lugs with which certain of the links of the conveyor chain 16 is provided and carried through the gravity door 10 and along the trackway 13.

As each pack reaches a position centrally opposite the incline 22 it will be directly over the flipper plungers 25 when the same will be automatically actuated or quickly elevated in a manner soon to be described for the purpose of flipping the said pack reversely onto the incline 22, to slide down onto the receiving platform 23. During this reversing action imparted to the packs, should the said packs tend to slide laterally they will come into contact with the abutment ledge 24 so that proper reversing of the faces of the pack from a one side face up position on the trackway 13 to the reverse face side up position on the platform 23 is assured.

To provide for the proper operation of the plungers 25 I provide a motor 40 which drives a continuously operating shaft 41 associated with an intermittently operated shaft 42 through the single rotation clutch 43 which may be of any approved type and which, per se, forms no part of my present invention. The shaft 42 has mounted thereon an eccentric 44 around which takes the strap 45 connected by the operating rod 46 with a cross bar 47 secured to the small crank ends of a number of bell crank levers 48 equivalent to the number of plungers. The long arms of the bell cranks 48 are slotted to receive the lugs 49 projected from the plungers 25.

Thus when the shaft 42 is operated through each single rotation the eccentric 44 will exert a quick pull and return on the short end of the bell crank levers imparting a long throw to the long ends of the levers and consequently a quick projection and retraction of the plungers 25 sufficient for assuring perfect reversing of the plate packs and the depositing thereof onto the incline 22.

To provide for throwing the single rotation clutch into operation to impart a desired single rotation to the shaft 42 I provide a pivoted lever 50 spring-held as at 51 to a normal position projected into the path of the upstanding lugs 15 on the conveyor chain 16 so that the said lever will be rocked each time one of the lugs of the chain passes the same and spring-returned to its normal position for engagement by the next lug. The lever is extended beyond its pivot and connected at 52 to the clutch so that each time the lever is rocked the clutch will be brought into action to impart a single rotation to the plunger actuating device.

As successive ones of the packs are deposited onto the receiving platform 23 a considerable stack thereof will soon accumulate and it is desirable to shift such stack along the platform 23 both to facilitate removal through the door 12 and to provide space for accommodating the next stack to be accumulated. I desire to accomplish this manually and provide a stack pushing plunger 53 which extends into engagement with the accumulated stack in the manner illustrated in Figure 3 of the drawings and which is connected to a piston 54 reciprocable in a steam or air cylinder 55 to the opposite ends of which conduit passes 56 are connected which communicate through the control valve 57 with the pressure line 58. Thus, by actuating the valve control 57, steam or air under pressure may be admitted into the desired end of the cylinder to act on the piston to retract or project the plunger.

When my apparatus is to be operated in the manner heretofore described I employ straight pusher lugs 59 which are removably secured to project from the conveyor lugs 15 on the chain 16, the said lugs being adapted to project vertically in a manner for engaging behind an edge of the packs to push them along the trackway 13 in the manner indicated in Figures 1 and 5 of the drawings. In this form of the invention, in which the packs are conveyed flatly along the trackway 13, the said trackway may be corrugated longitudinally, as indicated at 60, to permit heat circulation beneath the plates to effect uniform heating thereof as far as possible. By thus providing the corrugations uniform heating of the pack is possible and if it is desired the flipping or reversing action imparted to the packs and their deposit onto the receiving platform 23 may be eliminated and they may be permitted to continue their travel out through the offtake passage 9 through the door 11, it being understood, of course, that in this case the clutch actuating lever 50 would be removed from operative position.

However, when it is desired to convey the packs directly through the furnace without a reversing action I prefer to use upstanding supporting lugs 61 which may be substituted for the lugs 59 and each of which includes an angled stack edge receiving troughway 62 and a plurality of upstanding fingers 63. These lugs are so arranged on the chain 16 that as the chain passes up through the incline 39 the advance edge of the pack will be received in the troughway and the fingers will engage the bottom of the pack and elevate the same to an inclined position to carry the same along the trackway 13 and thus permitting perfect heat contact with both faces of the said pack while traversing the trackway 13. In this case all of the packs are conveyed directly through the offtake passage 9 and its door 11 and are deposited onto the downwardly inclined delivery chute 64, the bottom of which may be positioned conveniently adjacent the first roll set diagrammatically indicated at 65.

A cutout switch 66 is spliced in the electric circuit 67 which supplies power to the conveyor motor 30 and the said switch is located in position for being engaged by the swinging door 11 each time a pack is delivered through the said door onto the chute 64, to thus automatically cut out the motor and stop the movement of the conveyor chain 16. A switch resetting magnet 68 may be provided in a power circuit 69 embracing a control switch 70 positioned convenient to the attendant or attendants at the bottom of the chute 64, so that after the power for operating the conveyor chain 16 has been automatically cut off, after a pack has been deposited onto a chute, they may reset the same to restart the motor and again position the cutout lever for being engaged when the next plate is discharged.

Thus, as each pack is deposited onto the chute 64, operation of the conveyor chain may be automatically cut out so that too many of the packs will not be delivered at one time to crowd the attendant feeding the packs from the chute to the rolling device.

The tin packs are indicated at 71 and the pack stacks at 72.

In the foregoing description I have disclosed a furnace and apparatus for more conveniently and effectively handling and heating tin plate, black plate or sheet iron in a manner assuring perfect heating thereof with a minimum of effort and in a manner rendering possible the use of a minimum of necessary factory capacity to accomplish the required purposes.

From the foregoing description, taken in connection with the accompanying drawings, it is thought that the novel details of construction, the manner of operation and the advantages of my invention will be readily apparent to those skilled in the art to which the invention relates.

What I claim is:

1. In a tin-pack heating furnace, wherein is provided a heating chamber having an inlet at one place and an outlet at another place, gravity doors for said inlet and outlet, and an endless pack conveyor passing through said chamber from inlet to outlet; a primary conveyor for carrying the pack from a place adjacent the outlet part of the furnace outside to a place adjacent the inlet part of the furnace, another conveyor to receive the pack from the primary conveyor and deliver the same transversely, and an incline which receives the pack from the transverse conveyor and in turn delivers it to the endless conveyor within the heating chamber.

2. In a tin-pack heating furnace, a heating chamber having an inlet at one place and an outlet at another place, gravity doors for said inlet and outlet, an endless pack conveyor passing through said chamber from inlet to outlet, means for delivering tin-packs to the endless pack conveyor, said chamber having pack receiving portions, and means to eject the pack from the endless pack conveyor within the furnace chamber and stack the same on the pack receiving portions.

3. In a tin-pack heating furnace, a heating chamber having an inlet at one place and an outlet at another place, gravity doors for said inlet and outlet, an endless pack conveyor passing through said chamber from inlet to outlet, means for delivering tin-packs to the endless pack conveyor, said chamber having pack receiving portions, and means to eject the pack from the endless pack conveyor within the furnace chamber and stack the same on the pack receiving portions, said last named means including a plate flipper.

4. In tin-pack heating furnaces, which include a heating chamber having an inlet and an exit, means for moving the pack forwardly from a place adjacent the exit part of the furnace outside the same to a place adjacent the inlet of the furnace, another means to receive the pack from said moving means and move it laterally and then deliver it backwardly into the inlet of the heating chamber, means for moving the pack backwardly from the inlet through the chamber toward the outlet thereof.

5. In tin-pack heating furnaces, which include a heating chamber having an inlet and an exit, means for moving the pack from the inlet through the chamber toward the outlet thereof, and means to remove the pack from said last named moving means and stack the same within the furnace adjacent the outlet thereof.

6. In tin-pack heating furnaces, which include a heating chamber having an inlet and an exit, means for moving the pack from the inlet through the chamber toward the outlet thereof, and means for removing the pack laterally off said last named moving means and stacking the same within the furnace.

7. In tin-pack heating furnaces, which include a heating chamber having an inlet and an exit, means for moving the pack from the inlet through the chamber toward the outlet thereof, means to remove the pack from said last named moving means and stack the same within the furnace adjacent the outlet thereof, and means controlled by said last named moving means for operating said removing means.

8. In tin-pack heating furnaces, which include a heating chamber having an inlet and an exit, means for moving the pack from the inlet through the chamber toward the outlet thereof, means for removing the pack laterally off said last named moving means and stacking the same within the furnace, and means controlled by said last named moving means for operating said removing means.

9. In tin-pack heating furnaces, which include a heating chamber having an inlet and an exit, means for moving the pack from the inlet through the chamber toward the outlet thereof, pack engaging means controlled to operate at predetermined intervals to remove the pack from said last named moving means within the furnace, and an incline onto which said pack so removed is deposited to shoot the pack to another location within the furnace.

10. In a tin-pack heating furnace, the combination with a heating chamber having an inlet and an outlet end, of means for conveying the pack through the furnace to the outlet end of the heating chamber, pack discharging and turn-over mechanism for removing the pack from the conveyor within the furnace and turning it over to expose the other side, means to pile the packs in a stack within the furnace, and means for shifting a piled stack to another place in the furnace to make room for the piling of another stack.

11. In a tin-pack heating furnace, the combination with a heating chamber having an inlet and an outlet end, of means for conveying the pack through the furnace to the outlet end of the heating chamber thereof, and pack discharging and turn-over mechanism for removing the pack from the conveyor within the furnace and turning it over to expose the other side.

12. In a tin-pack heating furnace, the combination with a heating chamber having an inlet and an outlet end, of means for conveying the packs through the furnace to the outlet end of the heating chamber thereof, pack discharging and turn-over mechanism for removing the pack from the conveyor within the furnace and turning it over to expose the other side, and means to pile the packs in stacks within the furnace.

13. In a tin-pack heating furnace, the combination with a heating chamber having an inlet and an outlet end, of means for conveying the packs through the furnace to the outlet end of the heating chamber, pack discharging and turn-over mechanism for removing the packs from the conveyor within the furnace and turning them over to expose the other side, said mechanism comprising a plunger to engage beneath the packs at one side of the center of gravity to raise the packs on edge.

14. In a tin-pack heating furnace, the combination with a heating chamber having an inlet and an outlet end, of means for conveying the packs through the furnace to the outlet end of the heating chamber, pack discharging and turn-over mechanism for removing the packs from the conveyor within the furnace and turning them over to expose the other side, said mechanism comprising a plunger to engage beneath the packs at one side of the center of gravity to raise the packs on edge, and an abutment to be engaged by the pack edge opposite the plunger to retard the same for the purposes specified.

15. In a tin-pack heating furnace, the combination with a heating chamber having an inlet and an outlet end, of means for conveying the packs through the furnace to the outlet end of the heating chamber, pack discharging and turn-over mechanism for removing the packs from the conveyor within the furnace and turning them over to expose the other side, said mechanism comprising a plunger to engage beneath the packs at one side of the center of gravity to raise the packs on edge, an abutment to be engaged by the pack edge opposite the plunger to retard the same, and means governed by the movement of the conveyor within the furnace chamber for operating said plunger at timed intervals.

16. In a tin-pack heating furnace, the combination with a heating chamber having an inlet and an outlet end, of means for conveying the pack through the furnace to the outlet end of the heating chamber, pack discharging and turn-over mechanism for removing the pack from the conveyor within the furnace and turning it over to expose the other side, means to pile the packs in a stack within the furnace, and a laterally shiftable stack engaging plunger controllable from without the furnace.

GEORGE F. SOCKMAN.